United States Patent
Eerola

(10) Patent No.: US 8,391,335 B2
(45) Date of Patent: Mar. 5, 2013

(54) APPARATUS AND METHOD FOR CORRELATION IN A GPS RECEIVER

(75) Inventor: Ville A. Eerola, Hämeenlinna (FI)

(73) Assignee: RPX Corporation, San Francisco, CA (US)

( * ) Notice: Subject to any disclaimer, the term of this patent is extended or adjusted under 35 U.S.C. 154(b) by 761 days.

(21) Appl. No.: 12/311,754

(22) PCT Filed: Oct. 13, 2006

(86) PCT No.: PCT/IB2006/003613
§ 371 (c)(1),
(2), (4) Date: Nov. 20, 2009

(87) PCT Pub. No.: WO2008/044090
PCT Pub. Date: Apr. 17, 2008

(65) Prior Publication Data
US 2010/0061426 A1    Mar. 11, 2010

(51) Int. Cl.
*H04B 1/00* (2006.01)
(52) U.S. Cl. ......................... 375/146; 375/130
(58) Field of Classification Search .................. 375/146, 375/130, 147, 148, 152, 343, 349; 455/132, 455/137, 134
See application file for complete search history.

(56) References Cited

U.S. PATENT DOCUMENTS

| 6,757,345 B1 * | 6/2004 | Heinila ........................ 375/349 |
| 7,039,134 B1 | 5/2006 | Avital et al. .................. 375/343 |
| 2001/0002458 A1 | 5/2001 | Kohli ............................. 701/213 |
| 2001/0046255 A1 | 11/2001 | Shattil ........................... 375/142 |
| 2003/0026329 A1 * | 2/2003 | Goto ............................. 375/152 |

FOREIGN PATENT DOCUMENTS

| EP | 1 722 487 A1 | 11/2006 |
| WO | 2005/104392 A1 | 11/2005 |

OTHER PUBLICATIONS

International Search Report for PCT/IB2006/003613, dated Jul. 16, 2007 (date of completion of int'l search).
Akopian, D. et al., "Fast-Matched Filters in Time Domain for Global Positioning System Receivers", IEE Proceedings, Radar Sonar Navig., vol. 153, No. 6, Dec. 2006, p. 525-531.
Akopian, D. et al., "A Fast Matched Filter in Time domain", in Position Location and Navigation Symposium, PLANS 2004, Apr. 26-29, 2004, p. 455-460.

* cited by examiner

*Primary Examiner* — Khai Tran
(74) *Attorney, Agent, or Firm* — Howison & Arnott, L.L.P.

(57) ABSTRACT

An apparatus comprising: a first code controller for controlling the storage of a first spreading code portion; a first data input controller for controlling the storage of a first set of input samples; a second data input controller for controlling the storage of a second set of input samples; a combiner arranged to combine a spreading code sample with an input sample and output the resultant combination; a summer for summing said resultant combinations; and a combination controller arranged to control which of the stored first set of input samples or the stored second set of input samples provides said input sample for combination in the combiner.

20 Claims, 6 Drawing Sheets

APPARATUS AND METHOD FOR CORRELATION IN A GPS RECEIVER

FIELD OF THE INVENTION

Embodiments of the present invention relate to correlation. In particular, some embodiments relate to improved correlation for use in spread spectrum receiver circuitry such as Global Navigation Satellite System (GNSS) receiver circuitry.

BACKGROUND TO THE INVENTION

Some Global Navigation Satellite (GNSS) Systems such as Global Positioning System (GPS) and the proposed European system Galileo use Code Division Multiple Access (CDMA). This spread spectrum access scheme enables multiple communication channels to share a single frequency band by using orthogonal spreading codes to spread the data across the full frequency band. The spreading codes are also called pseudo random noise codes. A different spreading code is assigned to each satellite communication channel but all the satellite communication channels share the same frequency band.

Another Global Navigation Satellite System, GLONASS, uses frequency division multiple access. A different frequency band is assigned to each satellite communication channel but all the satellite communication channels share the same spreading code.

For the sake of simplicity, reference will now be made to a GNSS receiver, however, it should be appreciated that embodiments of the invention find application in other types of radio receivers.

A GNSS receiver is a complex system. It typically comprises an RF engine for demodulating RF signals, a measurement engine for acquiring the satellite communication channels, for tracking the satellite communication channels and for recovering transmitted data from each of the satellite communication channels and a position engine for solving time and geometric unknowns using the recovered data.

Acquisition is a complex process. The communication channel parameters are unknown and therefore "processing" is required to find those parameters. For a GPS system, which uses CDMA, the unknown parameters of the communication channel are the spreading code, the phase of the spreading code and the exact carrier frequency as modified by, for example, Doppler shifting.

The spreading code and the phase of the spreading code are typically found by correlation of samples of the received data with different spreading codes and different phase offsets. A large correlation value may be obtained for the correct spreading code and the closest phase offset.

Correlation of sampled data against a code may also occur in other receivers e.g. mobile cellular telephone receivers, such as base stations or mobile handset terminals. For example, synchronization of a mobile cellular terminal and network may be achieved using correlation. In additional, the processing of multi-path signals at a mobile cellular receiver typically involves a separate correlation for each multi-path (RAKE finger).

BRIEF DESCRIPTION OF THE INVENTION

According to a first embodiment of the invention there is provided an apparatus comprising: a first code controller operable to control the storage of a first spreading code portion; a first data input controller operable to control the storage of a first set of input samples; a second data input controller operable to control the storage of a second set of input samples; a combiner operable to combine a spreading code sample with an input sample and output the resultant combination; a summer operable to sum said resultant combinations; and a combination controller operable to control which of the stored first set of input samples or the stored second set of input samples provides said input sample for combination in the combiner.

According to another embodiment of the invention there is provided a method comprising: storing a first spreading code portion; selecting between at least a first set of input samples and a second set of input samples; combining the spreading code portion with the selected set of input samples to produce combinations; and summing the combinations.

According to another embodiment of the invention there is provided a computer program instructions arranged to control: selection between at least a first set of input samples and a second set of input samples; combination of a spreading code with the selected set of input samples to produce combinations; and summation of the combinations.

According to another embodiment of the invention there is provided a module comprising: a first code controller operable to control the storage of a first spreading code portion; a first data input controller operable to control the storage of a first set of input samples; a second data input controller operable to control the storage of a second set of input samples; a combiner operable to combine a spreading code sample with an input sample and output the resultant combination; a summer operable to sum said resultant combinations; and a combination controller operable to control which of the stored first set of input samples or the stored second set of input samples provides said input sample for combination in the combiner.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
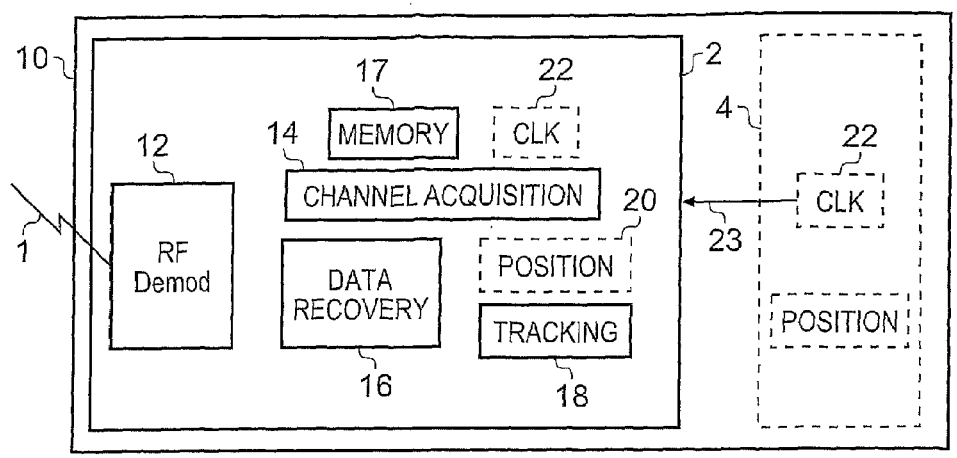
FIG. 1 schematically illustrates a receiver for obtaining a position from GNSS satellites.

FIG. 1 schematically illustrates a receiver 10 for obtaining a position from GNSS satellites.

The receiver 10 comprises circuitry 2 that positions the receiver 10. This circuitry 2 includes an RF engine 12 for demodulating RF signals, a measurement engine 14, 16, 18 for acquiring the satellite communication channels, for tracking the satellite communication channels and for recovering transmitted data from each of the satellite communication channels, a memory 17 for storing data and possibly a position engine 20 for solving time and geometric unknowns using the recovered data to determine the receiver system's position. The circuitry 2 may be provided as an integral module.

The engines may be provided via dedicated circuitry such as interconnected electronic components, integrated circuits or undedicated circuitry such as a programmable microprocessor (see FIG. 2) programmed, for example, using software or firmware.

Although the functions of tracking 18 and channel acquisition 14 are shown as separate blocks for clarity, they may share the same components or computer code. For example, according to one embodiment of the invention, tracking and channel acquisition may be performed using the same correlator 44.

Figure 2:
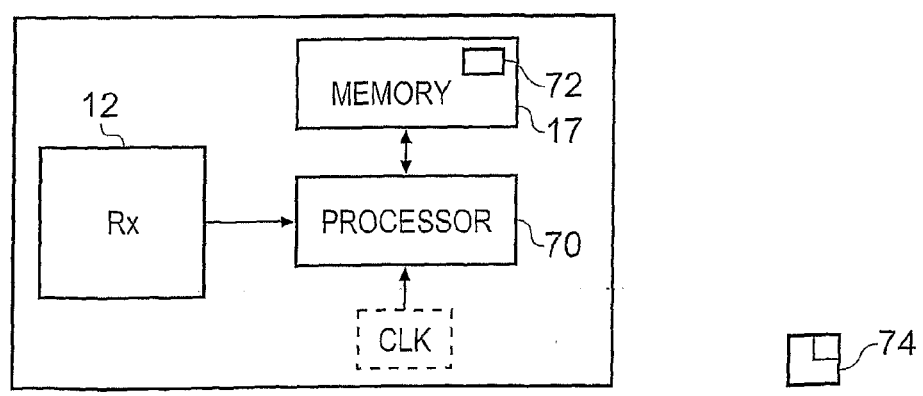
FIG. 2 is a schematic illustration of a device suitable for operating as a receiver.

In FIG. 2, a processor 70 is connected to receive data from a receiver 12 and is connected to read from and write to the memory 17. The memory 17 stores computer program instructions 72 that control the operation of the electronic device when loaded into the processor 70. The computer program instructions 72 provide the logic and routines that enables the electronic device to perform the methods described with reference to and/or illustrated in FIGS. 6-9.

The computer program instructions 72 may arrive at the electronic device via an electromagnetic carrier signal or be copied from a physical entity 74 such as a computer program product, a memory device or a record medium such as a CD-ROM or DVD.

In one embodiment, the receiver 10 is a GNSS receiver device that comprises a clock 22. In another embodiment, the receiver 10 comprises a host system 4 comprising a host clock 22. The host system 4 typically uses the host clock 22 in the provision of some functions other than satellite positioning such as, for example, cellular radio telephone operation or computer bus operation.

The clock 22 provides a time signal 23 to the circuitry 2 which is used as a time reference. The clock 22 may be produced by a crystal oscillator.

Encoded data 1 is received via a communications channel that has been encoded using at least two parameters, typically frequency and a spreading code.

A GNSS satellite communications channel is separated from the other satellite communication channels of the same GNSS by a unique combination of spreading code and frequency. In GPS, each satellite shares the same frequency band but has a different spreading code, whereas in GLONASS each satellite uses the same spreading code but has a different frequency band. As each channel is associated with a different satellite that has a different velocity relative to a receiver, each communications channel has, because of, for example, the Doppler effect, its own unknown frequency within a nominal carrier frequency band. A satellite communication channel can therefore be defined by the parameters: spreading code, spreading code phase, and frequency as affected by, for example, Doppler shift.

The spreading code phase gives an initial indication of the time of flight to the satellite from the receiver system 10 and is referred to as a pseudo-range. It is corrected for at least receiver clock error compared to the satellite clock before it represents a true range. It may also be corrected for satellite clock and orbit errors and RF signal transmission errors.

The measurement engine 14, 16, 18 comprises a channel acquisition block 14 for acquiring the satellite communication channels, a tracking block 18 for tracking the satellite communication channels and a data recovery block 16 for recovering transmitted data from each of the satellite communication channels.

Acquisition, performed by channel acquisition bock 14, is the process that positioning circuitry 2 uses to find satellite communication channels given a set of starting conditions (or uncertainties). This involves achieving frequency lock and code phase alignment and normally decoding data sufficiently to enable determination of a pseudo-range for each of four satellites.

Tracking of a communications channel, performed by the tracking block 18, involves the maintenance of the at least two parameters that define the channel and occasionally updating Satellite Data information as this changes from time to time (every 2 hours for GPS).

A position engine 20 solves at least four equations with four unknowns using the four pseudo-ranges to make a three dimensional position fix. The four unknowns are the three degrees of freedom in the receiver position (x, y, z) and the receiver time according to the 'true' satellite time reference (phase code offset). The positioning circuitry 2 must therefore typically acquire at least four separate communication channels and obtain at least four pseudo-ranges.

Figure 3:
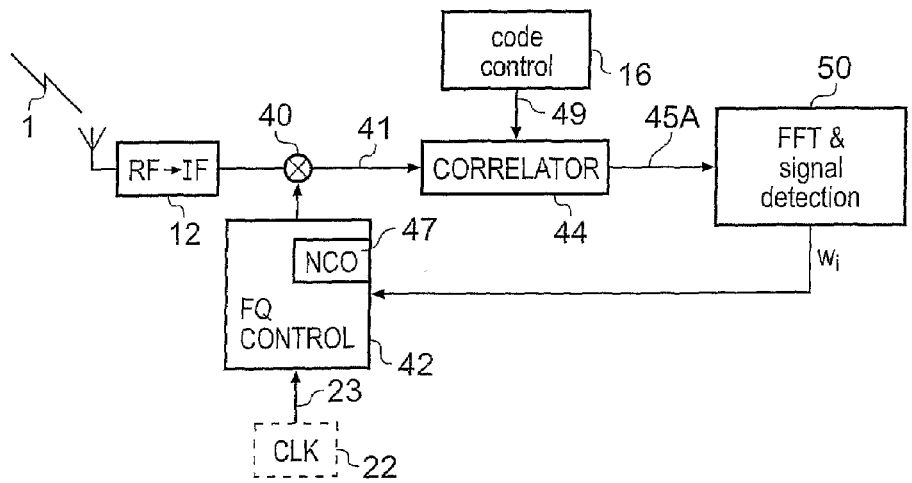
FIG. 3 schematically illustrates the receiver during channel acquisition.

FIG. 3 schematically illustrates positioning circuitry 2 during channel acquisition.

Encoded data 1 is received via an antenna and converted by the RF engine 12, it is then frequency shifted to an intermediate frequency (IF) and sampled. The samples are shifted from an intermediate frequency IF to a baseband frequency by mixer 40 under the control of frequency controller 42 followed possibly by resampling to create sampled data 41. The frequency controller 42 may be a numerically controlled oscillator (NCO) 47 which uses as its clock the time reference 23.

The sampled data 41 is correlated by correlator block 44 to produce a partially encoded signal 45A.

In this example, the positioning circuitry 2 is a GPS receiver and the encoded data is encoded using a satellite specific spreading code but a common frequency band offset by a satellite specific Doppler shift.

The correlator block 44 may be implemented as an adaptive correlator described in relation to FIGS. 5 to 9. The correlator block 44 cross-correlates portions of spreading codes provided by the code provider 46 and the sampled data 41.

The output from the correlator block 44, the partially encoded data 45A is decoded using frequency analysis and signal detection 50 using, for example, a Fast Fourier Transform. The frequency analysis and signal detection 50 identifies the frequencies $w_i$ of the communication channels which are returned to the frequency controller 42 where they may be used as a numeric input to the NCO.

Figure 4:
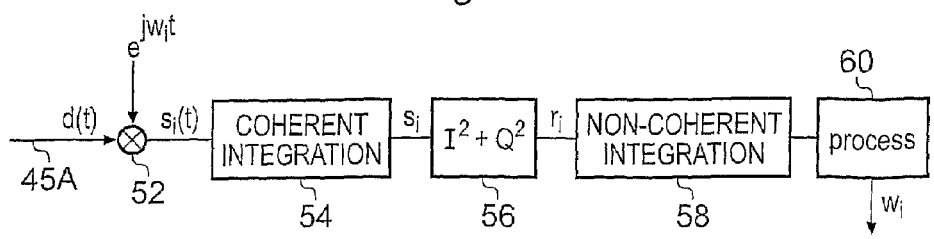
FIG. 4 illustrates a process of frequency analysis and signal detection.

The operation of the frequency analysis and signal detection block 50 is illustrated in more detail in FIG. 4.

The partially encoded data d(t) 45A is converted to the frequency domain by multiplication, using multiplier 52, separately with each of $\exp(jw_i t)$ for i=0, +1, −1, +2, −2, . . . +N, −N. The frequency $w_i$ is the central frequency of a frequency bin. The frequency bins may have the same fixed size W, in which case $w_i = w_o + i*W$.

$$s_i(t) = d(t) * \exp(jw_i t) \text{ for } i=0,+1,-1,+2,-2,\ldots +N,-N$$

The resultant signals $s_i$ are each coherently integrated, in block 54, over a time $T_c$ to create $S_i$:

$$S_i = \int_{t=0}^{T_c} S_i(t)\,dt$$

Each of the signals $S_i$ is then converted from a vector quantity I+jQ to a scalar quantity $r_i$ in block 56 where $r_i=\text{SQRT}(I^2+Q^2)$.

The resultant signals $r_i$ may be non-coherently integrated over a time $T_{nc}$ to create $R_i$:

$$R_i = \int_{t=0}^{T_{nc}} r_i(t)\,dt$$

The coherent and the non-coherent integration increase the signal to noise ratio (SNR).

As illustrated in FIGS. 5, 6, 7, 8 and 9, the correlator block 44 may be provided by an apparatus that operates as a configurable or adaptive correlator.

Figure 5:
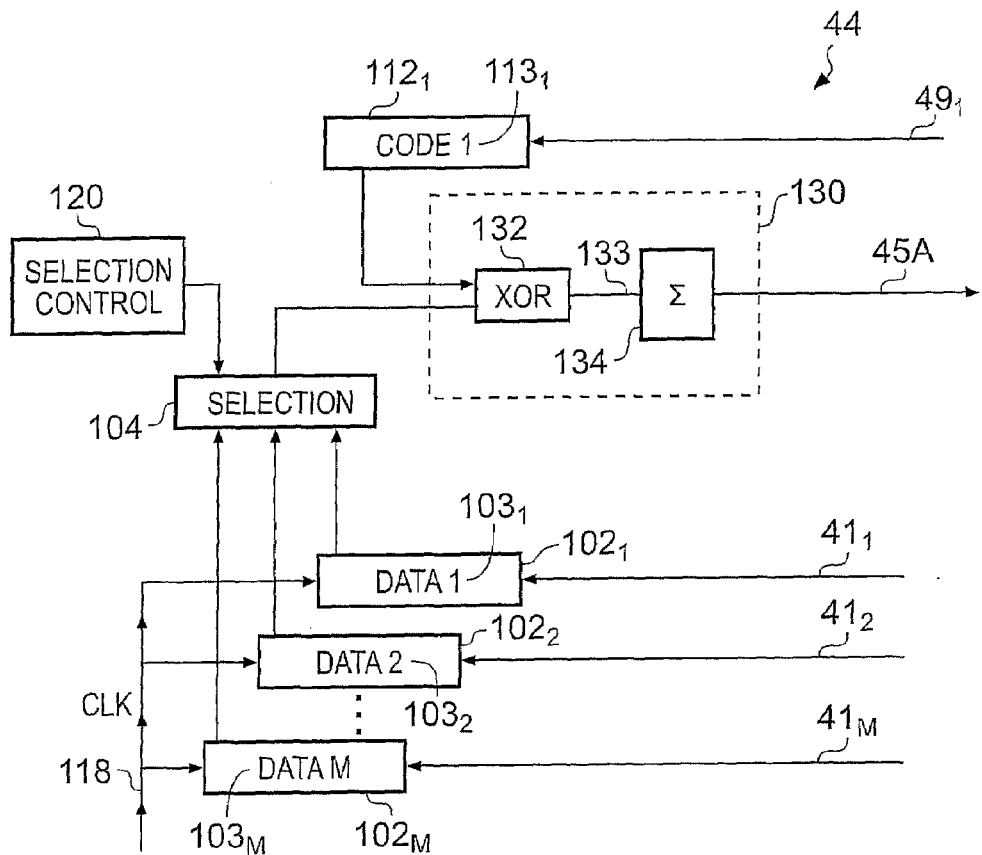
FIG. 5 schematically illustrates a correlator according to one embodiment.

The apparatus 44 illustrated in FIG. 5 comprises: a first code controller $112_1$ for controlling the storage of a first spreading code portion $49_1$ having samples or coefficients $113_1$; a first data input controller $102_1$ for controlling the ordered storage of a first set $103_1$ of input samples $41_1$; a second data input controller $102_2$ for controlling the ordered storage of a second set $103_2$ of input samples $41_2$; a combiner 132 arranged to combine a sample 113 of a spreading code 112 with an input sample 103 and output the resultant combination 133; a summer 134 for summing the resultant combinations 133; and a combination controller 120, 104 arranged to control which of the stored first set $103_1$ of input samples or the stored second set $103_2$ of input samples provides an input sample 105 for combination in the combiner 132.

Figure 7:
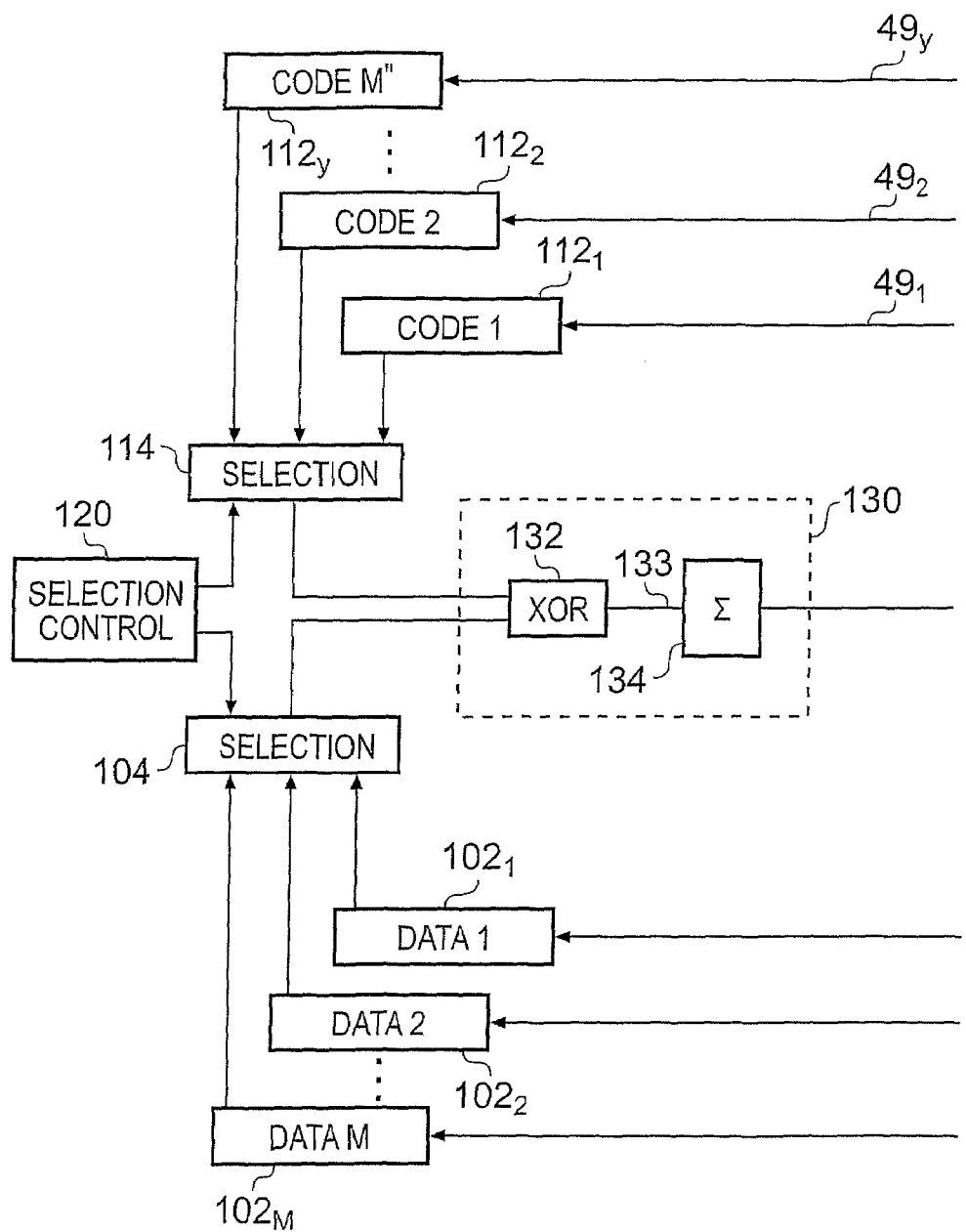
FIG. 7 schematically illustrates a correlator according to another embodiment.

The apparatus 44 illustrated in FIG. 7 comprises, in addition to the components illustrated in FIG. 5, a second code controller $112_2$ for controlling the storage of a second spreading code portion $49_2$ having samples $113_2$. The combination controller 120, 114 is further arranged 114 to control which of the stored first spreading code portion $49_1$ or the stored second spreading code portion $49_2$ provides a sample 113 of a spreading code for combination in the combiner 132.

Figure 9:
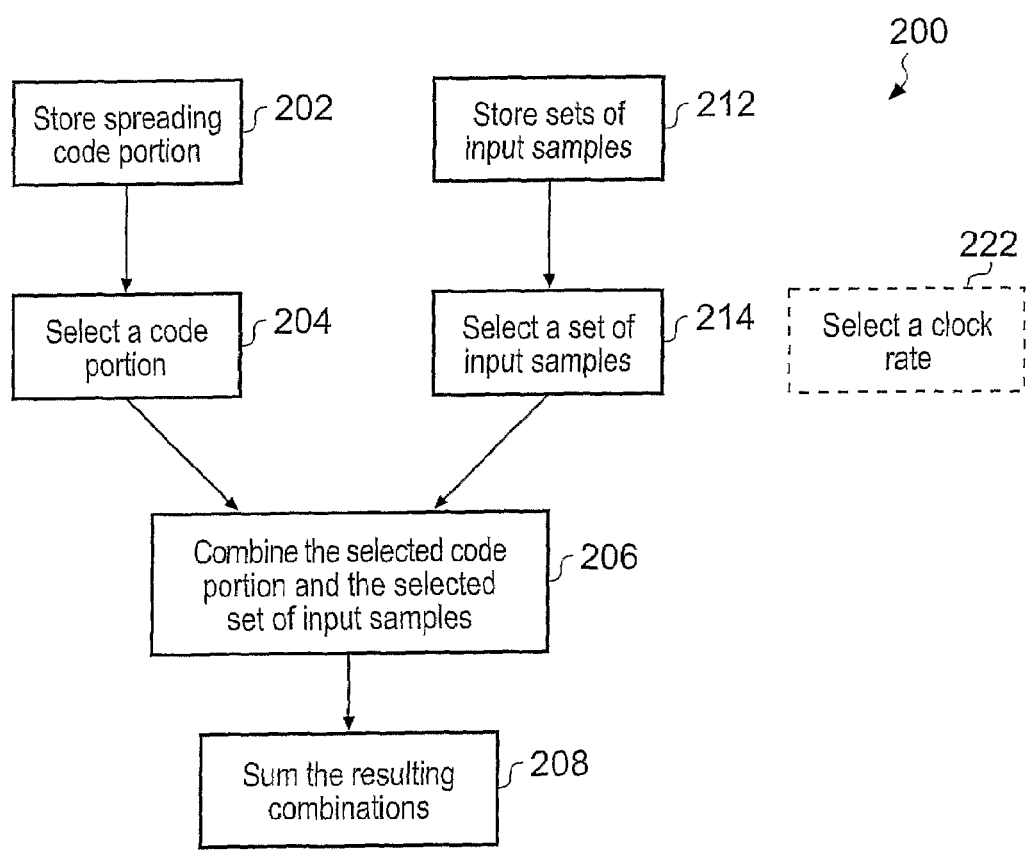
FIG. 9 schematically illustrates a correlation process.

As illustrated in FIG. 9, the correlation method 200 comprises: storing 202 spreading code portions; storing 212 sets of input samples; selecting 214 between at least a stored first set of input samples and a stored second set of input samples; selecting 204 between at least a stored first spreading code portion and a stored second spreading code portion; combining 206 the selected spreading code portion and the selected set of input samples to produce combinations; and summing 208 the combinations.

The computer program instructions 72 may be arranged to control: selection between at least a first set of input samples and a second set of input samples; combination of a spreading code with the selected set of input samples to produce combinations; and summation of the combinations. The computer program instructions 72 may be implemented in software or firmware.

Figure 6B:
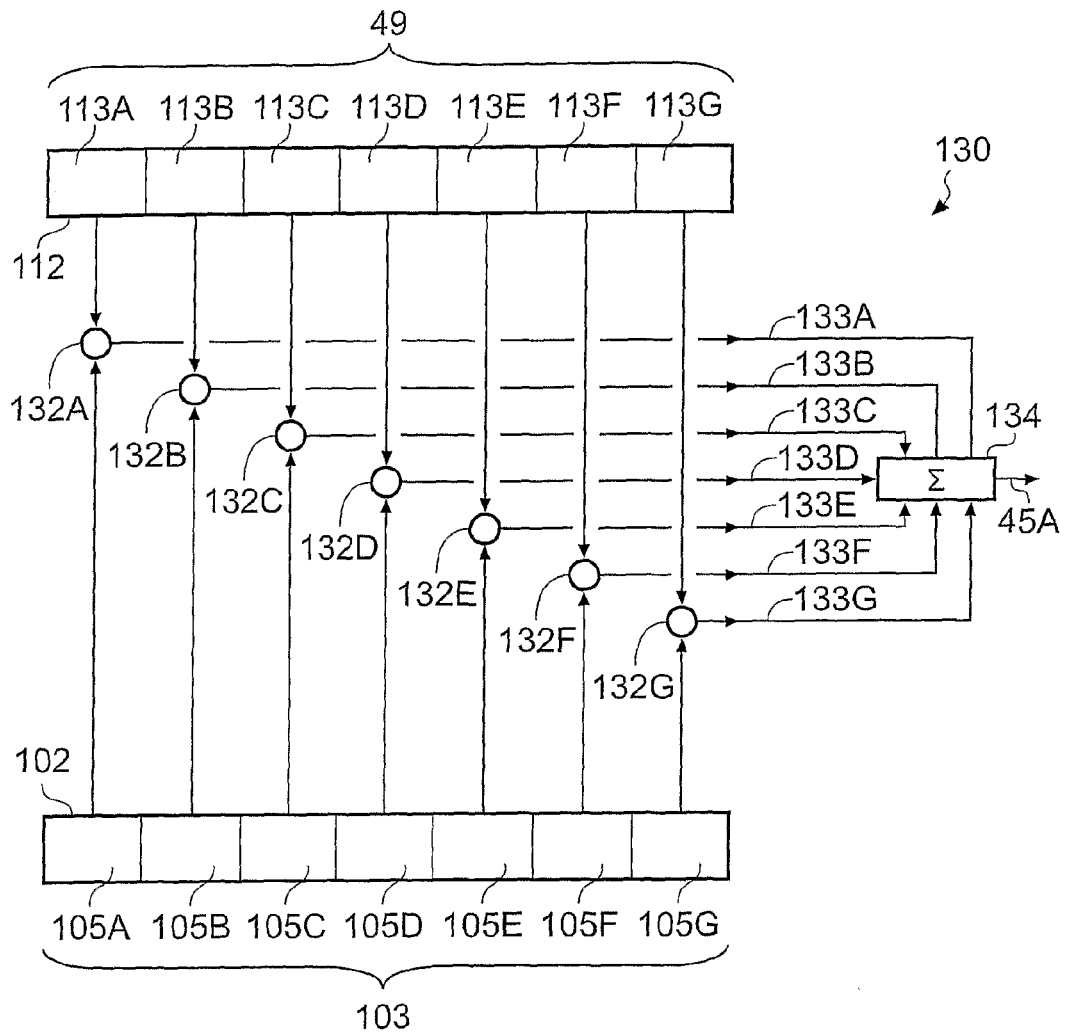
FIG. 6B schematically illustrates a multiply and sum block.

Referring to FIG. 5, the correlator 44 includes M data input controllers implemented as M separate sample registers $102_1$, $102_2$ ... $102_M$. Each register $102_i$ stores a set $103_i$ of N samples 105 as illustrated in FIG. 6B. The sets of samples $103_i$ are provided via the respective sampled data signals $41_i$.

A sample register 102 may be made of one or more discrete registers and the size N may be varied, by, for example, concatenating discrete registers.

Each sample register 102 is a shift register of size N controlled by a clock signal 118 provided by the clock 22. The shift register 102 shifts new samples 105 into the register at a 'sample rate' which may be approximately equal to or a multiple of the chipping rate. The stored input samples 105 are shifted each sampling period, so that a most recent sample $105_A$ is added to one end of the register 102 and the least recent sample is removed from the other end of the register 102.

The samples 105 may be the product of hard decisions or soft decisions. They may be symbols or bits.

The sampled data signals $41_i$ may be the same signal that has been transmitted by the same source and demodulated in the same RF engine 12. The sampled data signals $41_i$ may include different signals that have been transmitted by different sources and demodulated in the same RF engine 12. The sampled data signals $41_i$ may include different signals that have been transmitted by different sources and demodulated in the different RF engines 12. The sampled data signals $41_i$ may include different signals (e.g., GPS L1 and L2) that have been transmitted by the same source (e.g. same GPS satellite) and demodulated in the different RF engines 12

Each of the sample registers 102 is connected to provide an input to a selection block 104. The selection block 104 is controlled by the selection control block 120 to provide one of its inputs as an output. This output is provided as a first input to a multiply and sum block 130.

The correlator 44 also includes a first code controller $112_1$ that includes a code register $116_1$ that stores a set $49_1$ of N code samples 113. A code register 116 may be made of one or more discrete registers and the size N may be varied, by, for example, concatenating discrete registers.

The code register 116 is connected to provide a second input to the multiply and sum block 130.

The first input at the multiply and sum block 130 is a set of N input samples from a selected one of the sample registers 102. The second input at the multiply and sum block 130 is a set of N code samples.

At each sample period k, as schematically illustrated in FIG. 6B, for i=1 to N, a multiplier combines by exclusive-ORing $132_i$, the ith code sample $113_i$ of the code register 112 with the corresponding ith sample $105_i$ of the jth sample register $102_j$ to form N combinations (individual correlation values) $133_i$.

The N combinations 133 are summed 134 to create a correlation value C(j, k). C(j,k) corresponds to a (partial) correlation between the code (113) and data (102) at a relative phase offset $\Delta t_k$, where k=1 ... N. After each multiple of N samples the phase offset will be the same, and the result (C(j,k+n*N)) corresponds to a correlation at the same (relative) phase offset. These results C(j,k+n*N) can be accumulated to perform (coherent and noncoherent) integration.

It should be appreciated that a plurality of the sample registers 102 may be selected by the selection block 104 in each sample period. The selection block 104 multiplexes the sample registers. Consequently, C(j, k) is calculated for multiple values of j, each representing a selected sample register 102. Thus the presence of multiple sample registers increases the versatility of the correlator 44.

The selection of a specific sample register 102 'pairs' it with the code register 116.

Figure 6A:
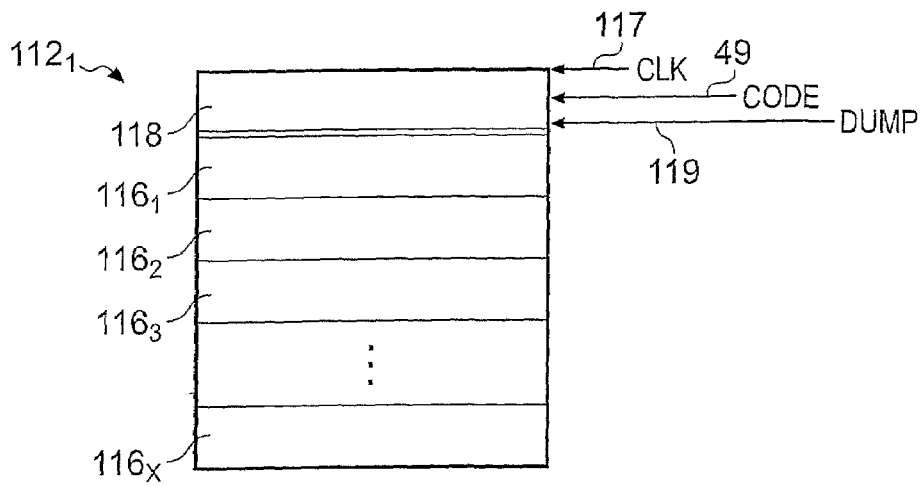
FIG. 6A schematically illustrates a code controller.

As illustrated in FIG. 6A, a code controller 112 may comprise a group or bank of code registers $116_1$, $116_1$ ... $116_X$ each of size N and a shift register 118 of size N.

The shift register 118 is controlled by the clock signal 117 provided by the clock 22. The shift register shifts new code samples 113 into the shift register 116 at the data sample rate.

The stored code samples 113 are shifted according to a code sample rate, such that a most recent code sample is added to one end of the register 118 and the least recent sample is removed from the other end of the register 118. Consequently every N code samples, the shift register 118 has been completely refreshed with new code samples.

Every N code samples, a dump signal 119 is generated and the content of the code register $116_x$ is moved to the code register $116_{x+1}$, for x=1 ... X−1, the content of the code register $116_x$ is discarded and the content of the shift register 118 refreshes the content of the code register $116_1$ by replacement Each of the code registers 116 typically represents the same code but with different phase offsets. Each of the code registers 116 is connected to provide a second input to a multiply and sum block 130 that receives a first input from the selected sample register.

A single multiply and sum block may be shared by the multiple code registers 116, by having an automatically multiplexed second input. The selection of a sample register 102 'pairs' it with a bank of code registers 116 each of which may represent a different code phase offset.

The correlator 44 illustrated in FIG. 7, is similar to that illustrated in FIG. 5 and like references are used for like parts. The correlator 44 of FIG. 7 comprises, as additional components, a plurality of code controllers $112_1$, $112_2$ ... $112_Y$ and a selection block 114, under the control of the selection control block 120, for selecting one of the plurality code controllers $112_j$ at a time to provide a selective second input to the multiply and sum block 130. This enables the multiplexing of different code controllers 112 onto the second input to the multiply and sum block 130.

The code controllers 112 may be a single code register or a bank of registers 116 as illustrated in FIG. 6A.

The selection control block 120 by controlling the code selection block 114 and the sample selection block 104 is able to pair particular sample registers 102 with particular code controllers 112.

The code controllers 112 may store portions of the same spreading code at different phase offsets, for example, such that code controllers 112 store adjacent, non-overlapping portions of the same spreading code. This may enable a greater phase space of a particular spreading code to be searched.

The code controllers 112 may store additionally or alternatively portions of different spreading codes. This may enable different code spaces to be searched at the same time using the same or different samples.

During satellite signal acquisition, a first set of input samples 103 from a satellite is processed using a predetermined one of a set of channel spreading codes to determine the code phase and carrier frequency. The first set of input samples 103 may be paired, using the selection controller 120, with multiple code portions 49 relating only to a spreading code or codes. Once a channel is acquired it is then tracked. The correlator 44 may be used to track that channel while still being used for acquisition of other channels.

For example, once a channel is acquired, it may be tracked by pairing a sample register 102 associated with that channel with a code controller 112 that is storing the correct spreading code for that channel at the correct phase offset. These paired sample register and code controller are then not available for channel acquisition.

It will therefore be appreciated that the correlator 44 may be used for only channel acquisition, for only channel tracking, for simultaneous channel acquisition and channel tracking. Channel acquisition may involve simultaneously acquiring of one or more channels. Channel tracking may involve simultaneously tracking one or more channels.

Figure 8:
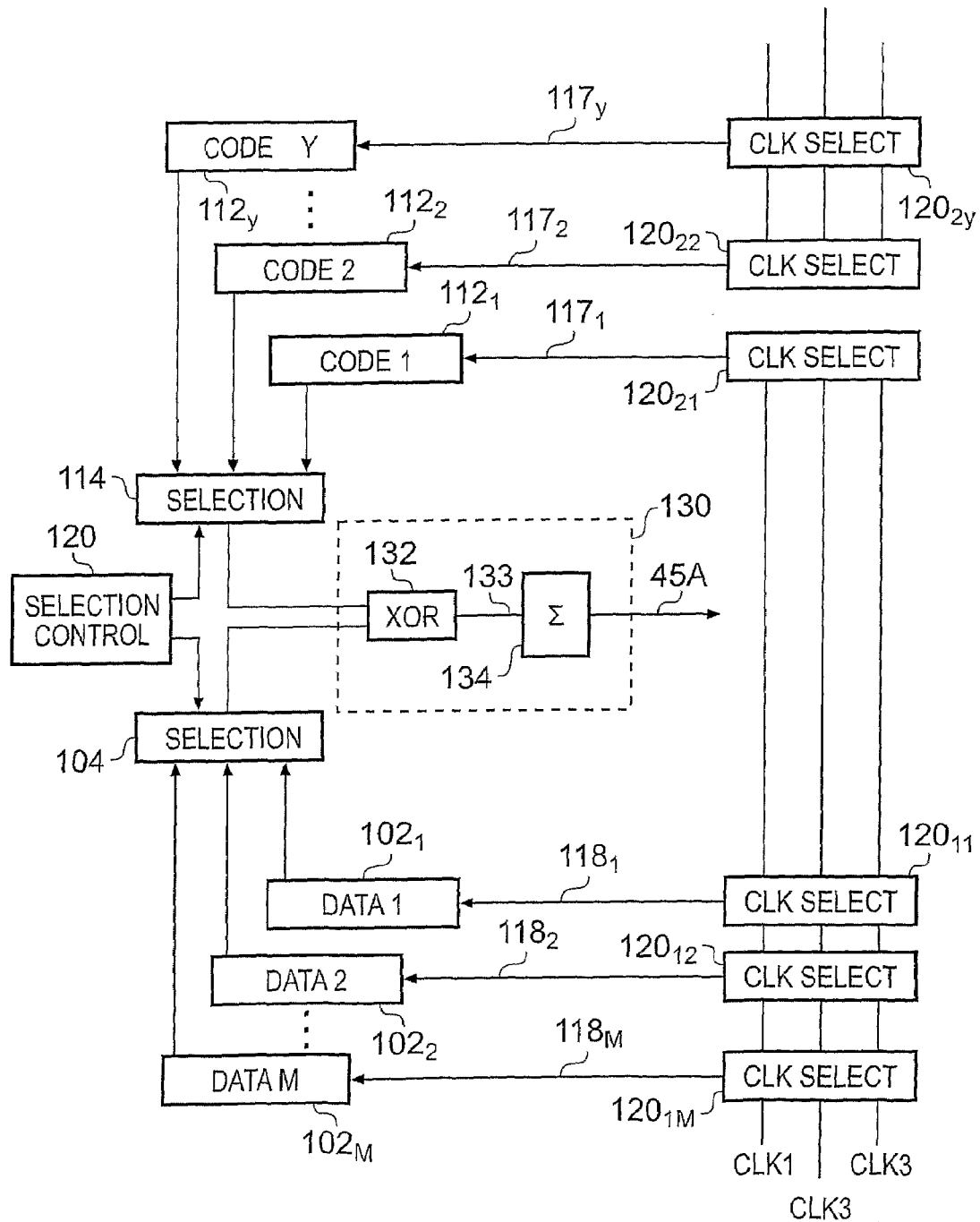
FIG. 8 schematically illustrates a correlator according to a further embodiment.

The correlator 44 illustrated in FIG. 8, is similar to that illustrated in FIG. 7 and like references are used for like parts. The correlator of FIG. 8 comprises, as additional components, a plurality of clock lines (CLK1, CLK2, CLK3 ...) and a plurality of clock selection blocks 120. The clock lines carry clock signals at different rates. At least one of the clock signals may have a clock rate that is an integer multiple of another of the clock signals.

A clock selection block $120_{2,j}$ is associated with each of the code controllers $112_j$. Each clock selection block $120_{2,j}$ determines which of the clock lines is provided as a controlling input. In the example, illustrated in FIG. 6A the controlling input is the code sample rate signal $117_j$. The dump signal is generated in dependence upon the size of the shift register 118 and the code sample rate (typically equal to the data sample rate).

A clock selection block $120_{1,i}$ is associated with each of the sample controllers $102_i$. Each clock selection block $120_{1,i}$ determines which of the clock lines is provided as a controlling input such as the sampling rate signal $118_i$.

When a code controller 112 is paired with a sample register 102 as described above, then a clock rate may be linked to the pair. The clock rate is typically the sampling rate for the input samples stored by the sample register 102 of the pair. The chipping rate used for the code controller may be the same clock rate or a fraction of that clock rate or another rate generated by the code NCO.

The clock selection block 120 associated with the linked sample register 102 is controlled to provide the correct sampling clock signal to that register. The clock selection block 120 associated with the linked code controller 102 is controlled to provide the correct code sampling clock signal to that code controller.

Varying the sampling rate varies the frequency with which the N correlations are calculated for the pair and summed.

The correlator 44 may receive inputs from different RF engines that have been sampled at different rates. The correlator 44 may therefore be capable to simultaneously correlating input sample signals from different communication systems.

If two registers have the same size and are clocked at different rates, then they are completely filled with different periodicities. It some embodiments it may be desirable to vary the size of a register in linear proportion to the clock rate used for that register so that all registers are completely filled with the same periodicity. This may make use of the partially encoded signal 45A easier at it will therefore contain data multiplexed at a single rate rather than multiple different rates.

Correlation of sampled data against a code may also occur in other receivers and receiver components such as matched filters. For example, the correlator 44 may be used as a component of a mobile cellular telephone receiver, such as base station or mobile handset terminal. Synchronization of a mobile cellular terminal and network may be achieved using correlation. The code phase offset is detected and used to achieve synchronization.

In addition, the processing of multi-path signals at a mobile cellular receiver typically involves a separate correlation for each multi-path (RAKE finger). In the illustrated examples, code controllers 112 and sample registers are paired. The paired code controllers may store the same spreading code with different offsets and the sample registers may store the same data.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
    a first code controller operable to control the storage of a first spreading code portion;
    a first data input controller operable to control the storage of a first set of input samples;
    a second data input controller operable to control the storage of a second set of input samples;
    a combiner operable to combine a spreading code sample with a selected one of the first set of input samples and the second set of input samples and output the resultant combination;
    a summer operable to sum said resultant combinations from the combiner; and
    a combination controller operable to select which of the first data input controller or the second data input controller provides said selected one of the first set of input samples and the second set of input samples for combination in the combiner.

2. An apparatus as claimed in claim 1, further comprising:
    a second code controller operable to control the storage of a second spreading code portion, wherein the combination controller is further arranged to control which of the stored first spreading code portion or the stored second spreading code portion provides a sample of a spreading code for combination in the combiner.

3. An apparatus as claimed in claim 1, wherein the first code controller comprises a shift register, clocked at a sample rate, and at least one holding register that is refreshed by the shift register at a slower rate.

4. An apparatus as claimed in claim 1, wherein data input controllers each comprise a shift register, for storing a set of input samples, that is clocked at a sample rate of the input samples.

5. An apparatus as claimed in claim 4, wherein the shift register has a size that is variable and linearly proportional to the sample rate at which it is clocked.

6. An apparatus as claimed in claim 1, wherein code controllers each comprise a register, for storing a set of code samples, wherein each register is refreshed with the same periodicity irrespective of its size.

7. An apparatus as claimed in claim 1, wherein, the combiner at every sample period p, multiplies the value in the ith position of the mth code portion with the corresponding value in the ith position of a jth set of input samples, for each value of i where i=1 to N, to form N combinations.

8. An apparatus as claimed in claim 7, wherein, the summer adds the N combinations to create a correlation value for the pair m, j and creates a cumulative sum over N sample periods for the correlation values of the pair m, j.

9. A spread spectrum receiver component comprising the apparatus of claim 1.

10. A method comprising:
    storing a first spreading code portion from a first code controller;
    selecting between at least a first set of input samples from a first data input controller and a second set of input samples from a second data input controller;
    combining within a combining circuit the first spreading code portion with the selected set of input samples to produce a combination; and
    summing within a summing circuit the combination with a previous combination.

11. A method as claimed in claim 10, comprising:
    storing a second spreading code portion from a second code controller;
    selecting between at least the first spreading code portion from the first code controller and the second spreading code portion from the second code controller; and
    combining the selected spreading code portion and the selected set of input samples to produce said combination.

12. A method as claimed in claim 10, or 11, comprising:
    storing multiple spreading code portions;
    storing sets of input samples;
    pairing spreading code portions and sets of input samples;
    combining a paired spreading code portion and set of input samples to produce combinations; and
    summing the combinations within the summing circuit.

13. A method as claimed in claim 10, wherein a first set of input samples is from an input channel that is not yet assigned to a spreading code, the method comprising: pairing the first set of input samples with multiple code portions relating only to a spreading code or codes that are not yet assigned to input channels.

14. A method as claimed in claim 10, wherein a second set of input samples is from an input channel that is assigned to a first spreading code, the method comprising: pairing the second set of input samples only with a code portion or code portions relating to the first spreading code.

15. A method as claimed in claim 10, comprising:
    storing multiple spreading code portions;
    storing sets of input samples;
    linking together spreading code portions, clock rates and sets of input samples;
    combining a linked spreading code and set of input samples, at a rate dependent upon the respective linked clock rate, to produce combinations; and
    summing the combinations.

16. A method as claimed in claim 10, comprising: storing sets of input samples in respective registers.

17. A method as claimed in claim 10, comprising: storing code portions in respective registers.

18. A method as claimed in claim 16, comprising: varying a size of a register.

19. A physical entity tangibly embodying a computer program comprising computer program instructions that when loaded into a processor enable the processor to control:
    selection between at least a first set of input samples from a first data input controller and a second set of input samples from a second data input controller;
    combination of a first spreading code with the selected set of input samples to produce a combination; and
    summation within a summing circuit of the combination with a previous combination.

20. A module comprising:
    a first code controller operable to control the storage of a first spreading code portion;

a first data input controller operable to control the storage of a first set of input samples;

a second data input controller operable to control the storage of a second set of input samples;

a combiner operable to combine a spreading code sample with a selected one of the first set of input samples and the second set of input samples and output the resultant combination;

a summer operable to sum said resultant combinations from the combiner; and a combination controller operable to select which of the first data input controller or the second data input controller provides said selected one of the first set of input samples and the second set of input samples for combination in the combiner.

* * * * *